(12) United States Patent
Berkowitz et al.

(10) Patent No.: US 12,718,213 B2
(45) Date of Patent: Aug. 25, 2026

(54) TOUCH SCREEN DEVICE FOR ENTERING DATA USING AUDITORY SIGNALS

(71) Applicant: CLOVER NETWORK, LLC, Sunnyvale, CA (US)

(72) Inventors: Cheryl N. Berkowitz, Brooklyn, NY (US); Jeff Blatman, San Jose, CA (US); Mary Katie Haritos, Seneca, SC (US); Siva Raja Sekhar Reddy Yeruva, Menlo Park, CA (US); Wako Takayama, Mountain View, CA (US); Jacob Whitaker Abrams, San Mateo, CA (US)

(73) Assignee: Clover Network, LLC, Sunnyvale, CA (US)

( * ) Notice: Subject to any disclaimer, the term of this patent is extended or adjusted under 35 U.S.C. 154(b) by 386 days.

(21) Appl. No.: 17/538,569

(22) Filed: Nov. 30, 2021

(65) Prior Publication Data

US 2023/0169481 A1 Jun. 1, 2023

(51) Int. Cl.
*G06Q 20/20* (2012.01)
*G06F 3/041* (2006.01)
(Continued)

(52) U.S. Cl.
CPC ............. *G06Q 20/20* (2013.01); *G06F 3/041* (2013.01); *G06F 3/167* (2013.01); *G09B 21/006* (2013.01)

(58) Field of Classification Search
CPC ......... G06Q 20/20; G06F 3/041; G06F 3/167; G06F 21/6245; G06F 21/31; G09B 21/006
See application file for complete search history.

(56) References Cited

U.S. PATENT DOCUMENTS 5,185,515 A * 2/1993 Nishibe ................. G07F 19/201 235/382
5,589,855 A 12/1996 Blumstein et al.
(Continued)

FOREIGN PATENT DOCUMENTS

AR 083918 A1 4/2013
AR 105355 A1 9/2017
(Continued)

OTHER PUBLICATIONS

Omari et al. "Investigating ATM System Accessibility for People with Visual Impairments", Dec. 2013, IOSR Journal of Computer Engineering, vol. 15, Issue 5, pp. 13-18. (Year: 2013).*
(Continued)

*Primary Examiner* — Aaron Tutor
*Assistant Examiner* — Jessica E Sullivan
(74) *Attorney, Agent, or Firm* — Foley & Lardner LLP

(57) ABSTRACT

A device includes a display and one or more processors that cause a speaker associated with the device to serially recite a plurality of auditory cues. Each of the plurality of auditory cues corresponds to one of a set of characters, and each recitation of the plurality of auditory cues occurs at a predetermined time period. The one or more processors also receive a touch input on the display from a user during the recitation of the plurality of auditory cues, determine a character from the set of characters that corresponds to the touch input based on the predetermined time period, and store the character as a value in a sequence of user-specific information.

23 Claims, 7 Drawing Sheets

(51) Int. Cl.
*G06F 3/16* (2006.01)
*G09B 21/00* (2006.01)

(56) References Cited

U.S. PATENT DOCUMENTS 6,625,201 B1 9/2003 Stirling-Gallacher
7,146,577 B2 12/2006 Hoffman
8,874,912 B2 10/2014 Barnett
8,978,975 B2 3/2015 Barnett
9,082,253 B1 7/2015 Harty et al.
9,658,763 B2 5/2017 Harty et al.
9,851,890 B2 12/2017 Kim et al.
10,055,053 B2 8/2018 Klein et al.
10,255,038 B2 4/2019 Chudge et al.
10,271,088 B2 * 4/2019 Ellis ........................ H04N 7/173
10,429,930 B2 10/2019 Day et al.
10,489,567 B2 11/2019 Haque et al.
10,521,046 B2 12/2019 Klein et al.
10,732,823 B2 8/2020 Gorlich et al.
10,735,225 B2 8/2020 Kim et al.
10,795,573 B2 10/2020 Macisaac et al.
10,838,692 B2 11/2020 Chudge et al.
10,884,565 B2 1/2021 Pavageau et al.
10,891,051 B2 1/2021 Klein et al.
10,921,891 B2 2/2021 Lin et al.
2007/0198358 A1 8/2007 Uehara
2012/0066650 A1 3/2012 Tirpak et al.
2012/0166944 A1 6/2012 Cotterill
2012/0319956 A1 12/2012 Talach et al.
2013/0113709 A1 5/2013 Wine
2013/0304474 A1 * 11/2013 Conkie ................. G06F 3/0488 704/260
2014/0173505 A1 6/2014 Urakawa
2014/0223549 A1 8/2014 Quintanilla
2014/0247237 A1 9/2014 Chan et al.
2015/0026613 A1 1/2015 Kwon et al.
2015/0121510 A1 4/2015 Gauteron et al.
2015/0161836 A1 6/2015 Park et al.
2015/0177270 A1 6/2015 Takano et al.
2015/0205379 A1 7/2015 Mag et al.
2015/0248196 A1 9/2015 Kadomatsu
2016/0224113 A1 8/2016 Day et al.
2016/0224966 A1 * 8/2016 Van Os .................. G06Q 20/32
2017/0269828 A1 * 9/2017 Gorlich ................... G06F 21/83
2017/0329510 A1 11/2017 Görlich et al.
2017/0357321 A1 12/2017 Fleizach et al.
2018/0095588 A1 4/2018 Klein et al.
2018/0203600 A1 7/2018 Hajimusa et al.
2018/0260108 A1 9/2018 Hajimusa et al.
2018/0341757 A1 11/2018 Haque et al.
2019/0064949 A1 2/2019 Blanc
2019/0179438 A1 6/2019 Benkley et al.
2019/0213306 A1 7/2019 Caselles et al.
2019/0369870 A1 12/2019 Marsden et al.
2020/0272320 A1 * 8/2020 Smith ................. G06F 3/04886
2020/0326841 A1 10/2020 Griffin et al.
2020/0353348 A1 * 11/2020 Fountaine ............... G06F 3/167
2020/0379621 A1 * 12/2020 Sartori .................. G06F 3/0488
2021/0089206 A1 3/2021 Klein et al.
2021/0125522 A1 4/2021 Berdugo et al.
2021/0352172 A1 * 11/2021 Kim ....................... H04R 27/00
2021/0383386 A1 * 12/2021 Abrams ................ G06F 3/0484

FOREIGN PATENT DOCUMENTS

AU 2019201546 A1 9/2019
CA 3061711 A1 11/2018
CA 3046511 A1 12/2019
CA 3119607 A1 12/2021
CN 103885705 A 6/2014
CN 110262671 A 9/2019
CN 111127780 A 5/2020
CN 111580737 A 8/2020
CN 112000273 A 11/2020
EP 2 713 304 A1 4/2014
EP 3 520 054 A1 4/2018
EP 2 746 925 A2 8/2018
EP 2 810 154 A1 3/2019
EP 3540573 A1 * 9/2019 ............. G06F 21/31
EP 3 582 090 A1 12/2020
EP 3 920 059 A1 12/2021
ES 2845250 T3 7/2021
FR 3082641 A1 12/2019
FR 3097350 A1 12/2020
GB 2 591 201 A 7/2021
GB 2 591 903 A 8/2021
GB 2 592 201 A 8/2021
JP 6328921 A 5/2018
JP 6931065 B2 9/2021
KR 102007651 B1 8/2019
KR 102108972 B1 5/2020
WO WO 2018/067605 A1 4/2018
WO WO 2018/217319 A1 11/2018
WO WO-2020/249787 A1 12/2020
WO WO-2021/014177 A1 1/2021
WO WO-2021/165683 A1 8/2021

OTHER PUBLICATIONS

Examination Report No. 1 issued in connection with AU Appl. Ser. No. 2021203509 dated Oct. 11, 2022.
Extended European Search Report and Written Opinion issued in connection with EP Appl. Ser. No. 22159025.0 dated Jul. 25, 2022.
He et al., Visual Step PIN Pad: Towards Foot-Input Authentication Using Geophones; 2020; IEEE; 9 pages.
Zeng et al., You are How You Touch: User Verification on Smartphone via Tapping Behavior; 2014; IEEE; 12 pages.
European Extended Search Report dated Oct. 10, 2021, European Patent Application No. 21176377.6, 8 pages.
Office Action issued in Canadian Appl. No. 3191205 dated May 21, 2025.
Office Action Issued in Argentina Patent Appl. No. P220100263 dated Sep. 24, 2025.

* cited by examiner

TOUCH SCREEN DEVICE FOR ENTERING DATA USING AUDITORY SIGNALS

BACKGROUND

Personal Identification Numbers (PIN) are widely used for a variety of applications that require identity verification. As the use of touch surfaces has increased, it has become common to provide interfaces for PIN entry that make use of touch technology. Touch surfaces, such as touch screen devices, generally rely upon a user's visual sensing ability to interact with a display of the touch screen device. Problems arise for visually impaired users using a touch screen device as they cannot sense the display visually.

SUMMARY

In accordance with some aspects of the present disclosure, a device is disclosed. The device includes a display and one or more non-transitory computer-readable media comprising computer-readable instructions stored thereon which, when executed by one or more processors of the device, cause the one or more processors to cause a speaker associated with the device to serially recite a plurality of auditory cues, such that each of the plurality of auditory cues corresponds to one of a set of characters, and such that each recitation of the plurality of auditory cues occurs at a predetermined time period, receive a touch input on the display from a user during the recitation of the plurality of auditory cues, determine a character from the set of characters that corresponds to the touch input based on the predetermined time period, and store the character as a value in a sequence of user-specific information.

In accordance with some aspects of the present disclosure, one or more non-transitory computer-readable media having computer-readable instructions stored thereon is disclosed. The computer-readable instructions when executed by one or more processors of a device cause the one or more processors to cause a speaker associated with the device to serially recite a plurality of auditory cues, such that each of the plurality of auditory cues corresponds to one of a set of characters, and such that each recitation of the plurality of auditory cues occurs at a predetermined time period, receive a touch input on the display from a user during the recitation of the plurality of auditory cues, determine a character from the set of characters that corresponds to the touch input based on the predetermined time period, and store the character as a value in a sequence of user-specific information.

In accordance with some aspects of the present disclosure, a device is disclosed. The device includes a touch screen display, a speaker, and one or more non-transitory computer-readable media comprising computer-readable instructions stored thereon which, when executed by one or more processors of the touch screen device, cause the one or more processors to cause a speaker associated with the device to serially recite a plurality of auditory cues, such that each of the plurality of auditory cues corresponds to one of a set of characters, and wherein each recitation of the plurality of auditory cues occurs at a predetermined time period, receive a touch input on the display from a user during the recitation of the plurality of auditory cues, determine a character from the set of characters that corresponds to the touch input based on the predetermined time period, and store the character as a value in a sequence of user-specific information.

The foregoing summary is illustrative only and is not intended to be in any way limiting. In addition to the illustrative aspects, embodiments, and features described above, further aspects, embodiments, and features will become apparent by reference to the following drawings and the detailed description.

Figure 1:
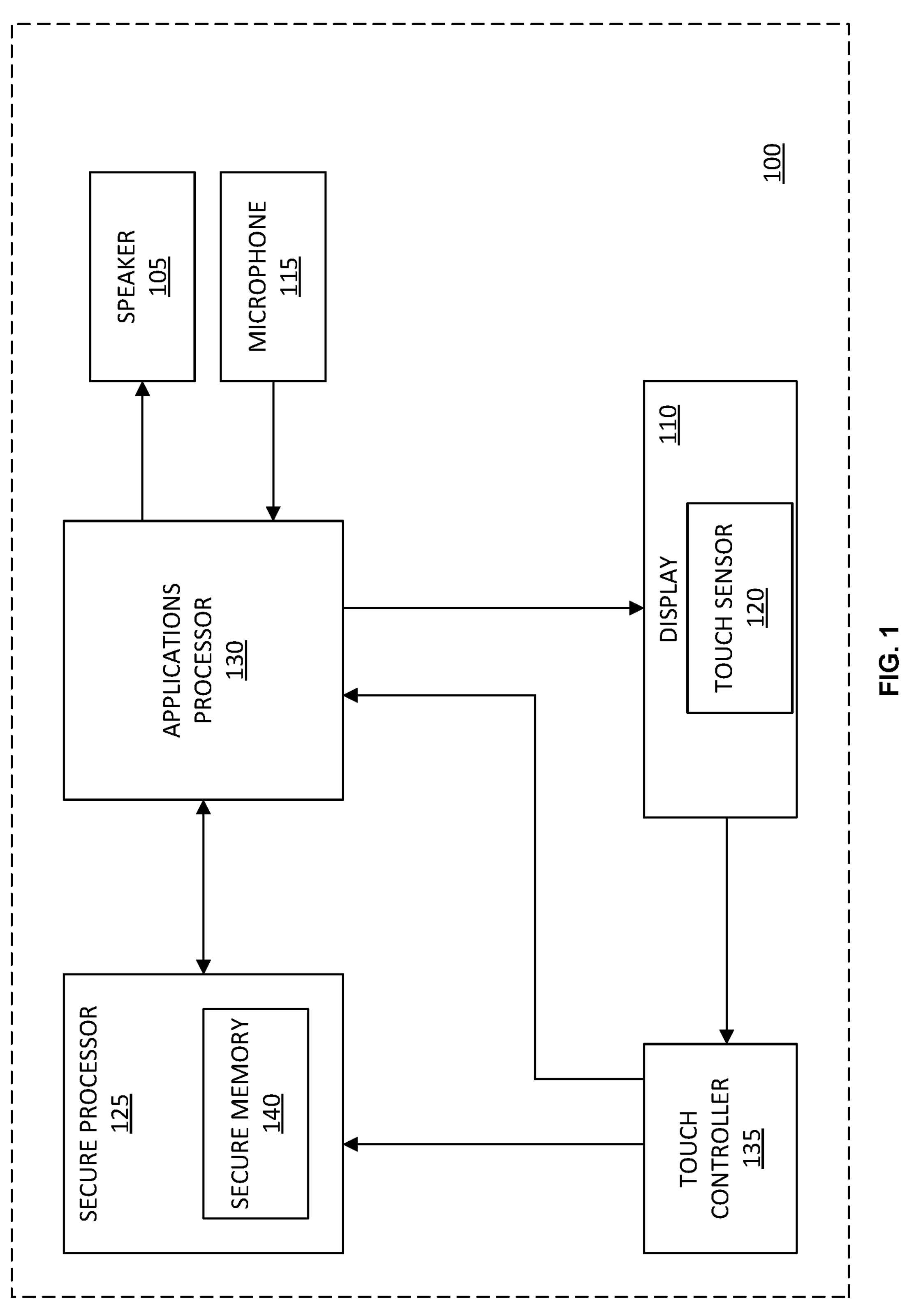
FIG. 1 is an example block diagram of a point of sale device, in accordance with some embodiments of the present disclosure.

The foregoing and other features of the present disclosure will become apparent from the following description and appended claims, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

The present disclosure is generally directed to touch screen devices for use by visually impaired (e.g., blind or low vision) users. Visually impaired users usually rely on tactile and auditory sensing abilities to discern the information being presented. For example, a visually impaired user may identify the locations of keys on a keyboard and interpret the characters or commands of those keys if the keyboard configuration is taught, or previously known. This is not possible with a touch screen device that has a smooth contact display surface. In some cases, tactile guides may be added to a display surface of the touch screen device. However, that approach does not resolve the plurality of issues that visually impaired users face. For example, inadvertent and undesired touch inputs may be registered on the display surface as the tactile guides are used to find the touch points of interest. Furthermore, visually impaired users may not be able to verify their touch inputs using touch point signifiers alone. In some cases, an audio device may be used with the touch screen display to read-back the user input aloud. This approach may inappropriately share private information with others nearby if in a public setting.

A point of sale (POS) device is an example of a touch screen device where a user may be required to interact with a display surface of the POS device without assistance from another party to safeguard the user's privacy and private information. For example, in some cases, a user may be required to enter a PIN using the display surface (e.g., for providing payment information, accessing a user account, or for other purposes). Increasingly, POS devices have smooth display surfaces (e.g., glass, plastic, resin, etc. surfaces) that are not very conducive to use by visually impaired users. A non-visually impaired user (or visually abled user) may have no difficulty utilizing such a POS device to enter their PIN. However, a visually impaired user may struggle to enter their PIN on that same POS device without any tactile cues or surfaces to aid the visually-impaired user. In these situations, the visually impaired user may need to provide their PIN to a clerk/administrator at the POS device, which undesirably provides a disadvantageous security situation in that both the clerk/administrator, and potential eavesdroppers, may be able to obtain the PIN.

Thus, the present disclosure provides a robust and secure mechanism to allow visually impaired users to enter data (e.g., PIN) into a touch screen device, such as a POS device, while maintaining the advantages afforded to visually able users, thereby providing a mechanism that may be used by both visually-impaired and visually-abled users. Further, the present disclosure safeguards the privacy of the visually impaired users, as well as protects the sensitive information of the users from eavesdroppers.

Specifically, the present disclosure provides a touch screen device (e.g., a POS device) that uses auditory signals or cues to allow a visually impaired user to enter their PIN. In some embodiments, the auditory cues may be recited using a speaker associated with the touch screen device (e.g., POS device). The auditory cues may be configured according to the configuration of the PIN. For example, if the PIN includes a series of numbers, the auditory cues may include numbers (e.g., 0-9). The auditory cues may be recited in one or more cycles depending upon the number of values in the PIN. For example, if the PIN is 4 digits long, the auditory cues may be recited in 4 cycles, with each cycle reciting the numbers 0-9. In each cycle, when the visually impaired user hears the auditory cue corresponding to the value of the PIN, the visually impaired user may provide a touch input (e.g., tap) on the touch screen device to enter the PIN.

For example, if the PIN is 1234, the first cycle may recite numbers 0-9. When the visually impaired user hears the number 1 being recited, the visually impaired user may tap on the touch screen device to enter the number 1. In a second cycle, the numbers 0-9 may be recited again. When the visually impaired user hears the number 2 being recited, the visually impaired user may tap on the touch screen device to enter the number 2. Third and fourth cycles may be similarly repeated for entering numbers 3 and 4 of the PIN. In some embodiments, in each cycle, the auditory cues may continue to be recited after the visually impaired user provides the touch input. For example, after the user taps 1 into the touch screen device, the numbers 2-9 may still be recited to avoid a situation in which someone overhears the auditory cues and detects the PIN that way.

Thus, this hear tap mechanism enables a visually impaired user to easily and conveniently enter user-specific sensitive data (e.g., PIN) without needing assistance or worrying about privacy or eavesdropping concerns.

It is to be understood that while the present disclosure is discussed in the context of a POS device, the present disclosure may be applicable to any type of touch screen device or human machine interface that allows visually impaired users to enter data. Further, although the present disclosure has been discussed in the context of entering a PIN, in other embodiments, the present disclosure may be used for entering other types of data, such as payment information, address, zip code, etc. In general, the present disclosure may be used for entering any numerical data, alphabetical data, special characters, and/or alphanumeric characters.

Referring now to FIG. 1, an example block diagram of a POS device 100 is shown, in accordance with some embodiments of the present disclosure. In some embodiments, the POS device 100 may be used to facilitate a purchase of goods and/or services (e.g., at a retail store, in a restaurant, at a gas station, etc.). The POS device 100 may be configured to receive information from users and present information to users. In some embodiments, the POS device 100 may be configured to present information to users in a variety of ways. For example, in some embodiments, a speaker 105 associated with the POS device may provide auditory cues, voice commands, or indicative sounds to users (e.g., to tell a user how to enter a PIN, facilitate entering of the PIN, guide the user through the payment process, etc.). In some embodiments, a display 110 may be a graphical user interface configured to provide visual information (e.g., to provide prompts to enter data, etc.) to a user. The POS device 100 may also be configured to present outputs/information to entities other than users. For example, the POS device 100 may be configured to present information to external systems such as printers, speakers, etc. Therefore, although not shown, POS device 100 may be associated with a variety of hardware, software, firmware components, or combinations thereof, that enable the POS device to output a variety of information.

Similarly, the POS device 100 may be configured to receive information from users in a variety of ways. For example, in some embodiments, the POS device 100 may be associated with a microphone 115 to allow a user to provide auditory cues, commands, or indicative sounds to the POS device (e.g., to speak in the microphone to enter information such as a PIN). In some embodiments, the display 110 may include a touch sensor 120 to receive information from the user (e.g., by tapping on a designated area of the display 110 to enter information such as a PIN). By virtue of having the touch sensor 120, the display 110 may be considered a touch screen display. Thus, the POS device 100 may provide a touch screen interface and the display 110 may be configured to both display information to the users, as well as serve as a tool for the users to input information into the POS device 100. The POS device 100 may include other mechanisms for receiving inputs from the users. For example, the POS device 100 may be configured to receive the user inputs using input technologies including, but not limited to, a keyboard, a stylus, a mouse, a track ball, a keypad, other types of voice recognition, motion recognition, remote controllers, gesture detectors such as gesture sensors or cameras, input ports, one or more buttons, dials, joysticks, etc. that allow an external source, such as the user, to enter information into the POS device.

Figure 7:
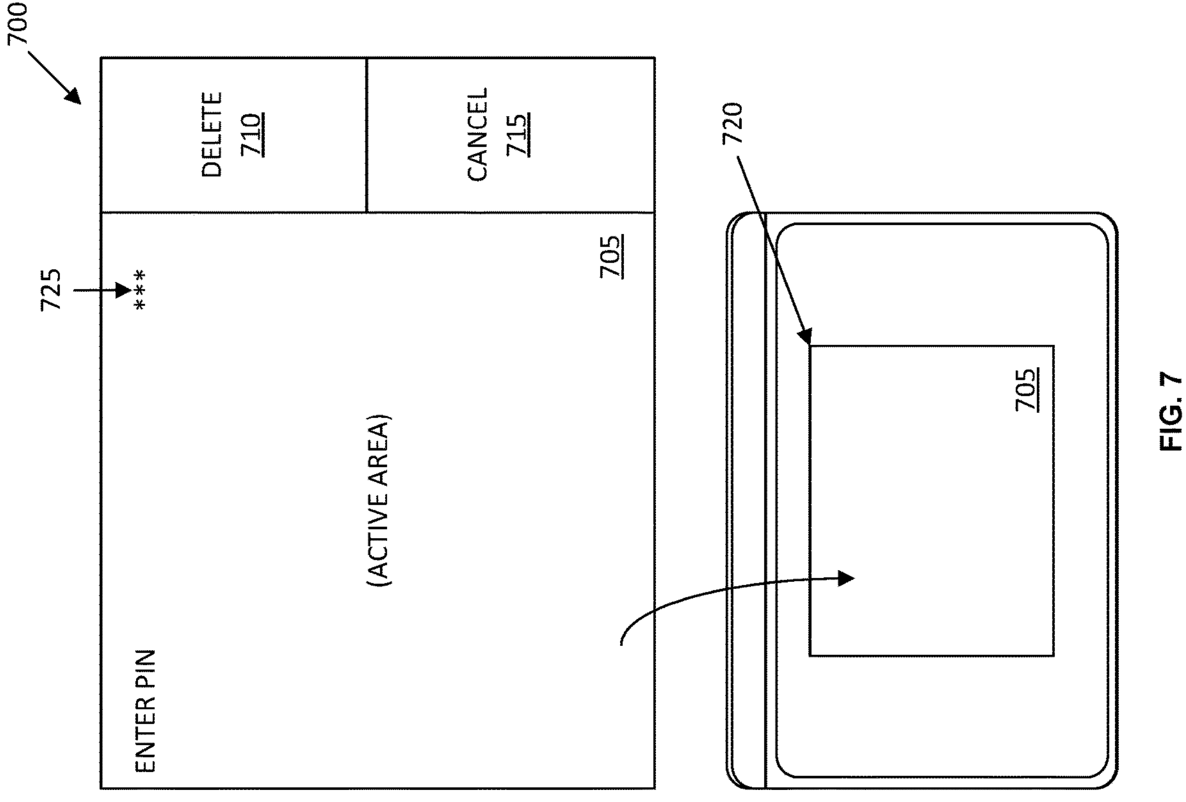
FIG. 7 is an example display of the point of sale device of FIGS. 1 and 2, in accordance with some embodiments of the present disclosure.

Generally speaking, the POS device 100 may be associated with any type of hardware, software, and/or firmware component that enables the POS device to perform the functions described herein. Thus, the POS device 100, and particularly the display 110, may be configured in a variety of ways for use by both visually impaired and visually abled users. An example of a display is shown in FIG. 7 below. In some embodiments, the POS device 100 may be associated with other devices or systems. For example, in some embodiments, the POS device 100 may include, or be associated with, a merchant device that may be operated by a merchant clerk or administrator. In some embodiments, the POS device 100 may receive instructions from such a merchant device. Based on the received instructions, the POS device 100 may either output information to a user or request information from the user. In some embodiments, based on the received instructions, the POS device 100 may change a mode of operation. For example, in some embodiments, the POS device 100 may switch between operating in a first mode configured for visually abled users and operating in a second mode configured for visually impaired users. In some embodiments, the change in the mode of operation may be facilitated in a variety of ways. For example, in some embodiments, the change in the mode of operation may be facilitated by selecting the appropriate option from the merchant device and/or the POS device 100. In other embodiments, the change in the mode of operation may be facilitated by plugging in a headset in the POS device 100 and/or the merchant device to activate the second mode and allow a visually impaired user to enter the PIN using the display 110. Upon unplugging the headset, the mode of operation may switch back to the first mode for visually abled users. In other embodiments, the change in the mode of operation may be facilitated in other ways.

The display 110 of the POS device 100 may form the front-end of the POS device. A secure processor 125, an applications processor 130, and a touch controller 135 may form a backend of the POS device 100. The secure processor 125, the applications processor 130, and the touch controller 135 may each be configured to process data received from a user, present data to the user, and otherwise facilitate a transaction. Although the secure processor 125, the applications processor 130, and the touch controller 135 are each shown as separate components, in some embodiments, one or more of those components may be integrated into a single component, and the single component may perform the operations of the individual components that are combined. In some embodiments, one or more of the secure processor 125, the applications processor 130, and the touch controller 135 may be located on one or more printed circuit boards of the POS device 100. In some embodiments, each of the secure processor 125, the applications processor 130, and the touch controller 135 may be configured as software, hardware, firmware, or combination thereof.

Although not shown, each of the secure processor 125, the applications processor 130, and the touch controller 135 may be associated with a processor (e.g., a central processing unit). The processor may be implemented in hardware, firmware, software, or any combination thereof. The processor may be configured to execute instructions for implementing the various functions of the respective component (e.g., the secure processor, the applications processor, and the touch controller). "Executing an instruction" means that the processor may perform the operations called for by that instruction. The processor may retrieve a set of instructions from a memory for execution. For example, in some embodiments, the processor may retrieve the instructions from a permanent memory device like a read only memory (ROM) device and copy the instructions in an executable form to a temporary memory device that is generally some form of random access memory (RAM). The ROM and/or RAM may both be part of a memory of the POS device 100 and/or memory individually allocated to the respective one of the secure processor 125, the applications processor 130, and the touch controller 135. In some embodiments, the processor may be configured to execute instructions without first copying those instructions to the RAM. The processor may be a special purpose computer, and include logic circuits, hardware circuits, etc. to carry out the instructions. The processor may include a single stand-alone processor, or a plurality of processors that use the same or different processing technology. The instructions may be written using one or more programming language, scripting language, assembly language, etc.

One or more of the secure processor 125, the applications processor 130, and the touch controller 135 may also include a memory. For example, the secure processor 125 is shown to include a secure memory 140. Although the applications processor 130 and the touch controller 135 are not shown as including a memory, either or both of those components may include a memory. The memory may be any of a variety of volatile and/or non-volatile memories that may be considered suitable for use with the POS device 100. In some embodiments, the memory may be configured to store the instructions that are used by the processor of the underlying component (e.g., the secure processor 125, the applications processor 130, and the touch controller 135). Further, although not shown, each of the secure processor 125, the applications processor 130, and the touch controller 135 may include, or be associated with, other or additional elements (e.g., timers) to enable those components to perform the functions described herein.

The secure processor 125 may be configured to perform secure operations on the POS device 100, such as handling payment information and identifying the PIN entered on the display 110. The secure processor 125 may be in operative communication with an applications processor 130 and the touch controller 135. For example, in some embodiments, the secure processor 125 may receive a communication/command from the applications processor 130 that the PIN entry process on the display 110 is starting. Upon receiving that communication/command, the secure processor 125 may start the process for recognizing the PIN characters. In some embodiments, upon receiving the PIN characters, the secure processor 125 may encrypt the PIN characters and send the encrypted PIN to the applications processor 130 for performing additional actions. Thus, in some embodiments, the PIN of the user may only be known to the secure processor 125, thereby increasing the security of the POS device 100 and limiting the components that are aware of sensitive information. Similarly, in some embodiments, the secure processor 125 may receive a communication/command from the applications processor 130 to start receiving payment information. Upon receiving the communication/command, the secure processor 125 may start recognizing the payment data. The secure processor 125 may also encrypt the payment data before sending the encrypted payment data to the applications processor 130. The secure processor 125 and the applications processor 130 may similarly be configured to handle other sensitive data.

In some embodiments, the secure processor 125 may be a chip that is separate from the applications processor 130. The secure processor 125 may handle sensitive information in an isolated environment to mitigate hardware and software attacks which may compromise sensitive card data or customer PIN. In some embodiments, the separate chip may be required to pass Payment Card Industry (PCI) PIN Transaction Security (PTS) Point of Interaction (POI) device requirements that define a security standard that payment devices which optionally accept PINs and process sensitive cardholder account data adhere to.

The applications processor 130 may be considered a master processor for the POS device 100. In some embodiments, the applications processor 130 may be responsible for instantiating an operating system for the POS device 100. In some embodiments, the applications processor 130 may be responsible for handling the interaction of the secure processor 125 with the different mechanisms for outputting and inputting information, and isolating the secure processor from these mechanisms, thereby improving the security of the POS device. For example, audio outputs (e.g., the speaker 105) may be managed by the applications processor 130 to recite the auditory cues. To "recite" the auditory cues, the applications processor 130 may generate one or more signals to cause the speaker 105 to generate the auditory cues and output the auditory cues. The content to be displayed on the display 110 may likewise be controlled by the applications processor 130. Communications between the secure processor 125 and the applications processor 130 are discussed in greater detail below.

The touch controller 135 may be configured to detect touch signals or inputs from the display 110. Thus, in some embodiments, the touch controller 135 may be associated with the touch sensor 120. In some embodiments, the touch controller 135 may be configured to detect the touch coordinates (e.g., X coordinates and Y coordinates) of the display 110 corresponding to the location on the display where a touch input is received. Depending upon the type of data that is being input into the display 110, the touch controller 135 may selectively pass that data (e.g., the touch coordinates of the data) to either the applications processor 130 or the secure processor 125. Thus, in some embodiments, the touch controller 135 may be in operative communication with both the secure processor 125 and the applications processor 130. In some embodiments, the touch controller 135 may be configured such that touch coordinates for non-secure operations, such as adjusting the configurations of the display 110, may be routed directly to the applications processor 130, and touch coordinates for secure operations, such as entering a PIN, may be routed directly to the secure processor 125.

In some embodiments, the touch controller 135 may be configured such that the communicative connection between the secure processor 125 and the touch controller does not pass through applications processor 130. For example, in some embodiments, the touch controller 135 may be configured such that all touch data (e.g., touch coordinates) from the touch controller is first routed to the secure processor 125 and is only routed onward to the applications processor 130 if it is determined that the touch controller is not being used to provide payment information. As another example, the touch controller 135 may be configured to change a routing state for the touch data between being routed to the applications processor 130 and the secure processor 125 based on a detected mode in which the POS device 100 is operating. In some embodiments, data may be routed directly to the applications processor 130 in an unsecure mode (e.g., where unsecure data is being received) and to the secure processor 125 in a secure mode (e.g., where secure data is being received). The applications processor 130, or an application running therein, may be configured to transmit a command, such as an accessibility sequence entry commencement command, to the secure processor 125 to indicate that sensitive data, such as a PIN, is to be entered on the display 110 now. The data from the touch sensor 120 may be routed to the secure processor 125 after the command is received by the secure processor. In some embodiments, the secure processor 125 may send an acknowledgment of the command to indicate that the POS device 100 is now in a sensitive data entry mode. The interactions between the secure processor 125, the applications processor 130, and the touch controller 135 are discussed in greater detail in FIG. 2.

Figure 2:
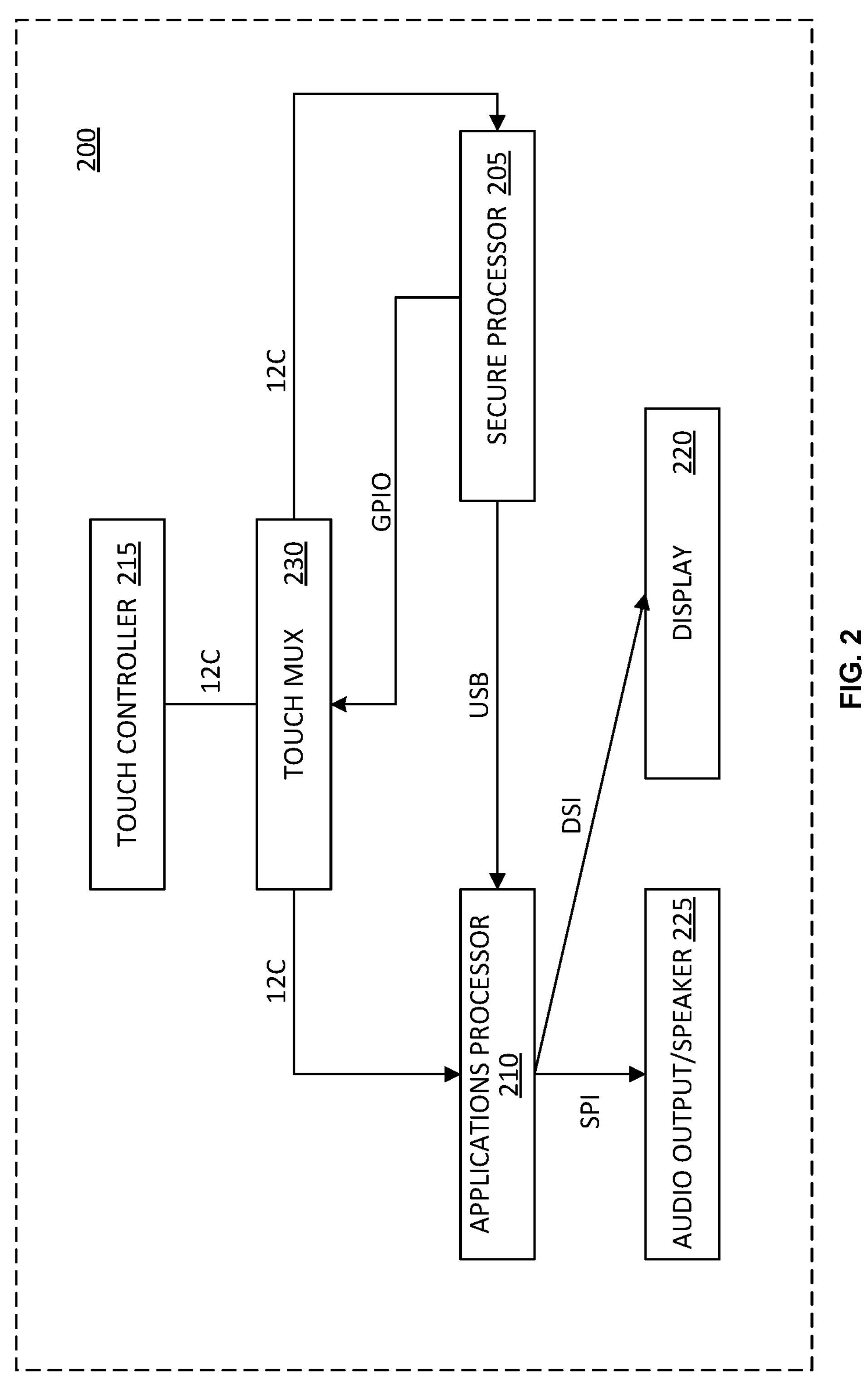
FIG. 2 is an example block diagram showing additional details of the point of sale device of FIG. 1, in accordance with some embodiments of the present disclosure.

Turning now to FIG. 2, a POS device 200 is shown, in accordance with some embodiments of the present disclosure. The POS device 200 has the same components as the POS device 100, and therefore those components are not described again. Thus, the POS device 200 has a secure processor 205 similar to the secure processor 125, an applications processor 210 similar to the applications processor 130, and a touch controller 215 similar to the touch controller 135. The POS device 200 also includes a display 220 similar to the display 110. Although not shown, the display 220 may include a touch sensor (e.g., the touch sensor 120). The POS device 200 may also include output device(s) such as an audio output device or speaker 225 (e.g., the speaker 105). Although not shown, the POS device 200 may also include input device(s) such as a microphone similar to the microphone 115.

The POS device 200 shows the interactions between the secure processor 205, the applications processor 210, and the touch controller 215 in greater detail. In order for the touch inputs (e.g., touch coordinates) to be routed to either or both the applications processor 210 or the secure processor 205, in some embodiments, the touch controller 215 may be associated with a multiplexer 230. In some embodiments, the multiplexer 230 may be implemented by the touch controller 215 or may be a dedicated element within the POS device 200. The multiplexer 230 may be configured in software, hardware, firmware, or combinations thereof. The touch controller 215 may receive touch inputs from a touch sensor (e.g., the touch sensor 120) of the display 220. The touch controller 215 may send the touch inputs to the multiplexer 230, which may then forward the touch inputs to the respective one of the secure processor 205 and/or the applications processor 210 depending on the type (e.g., secure data or unsecure data) of touch inputs, the mode (e.g., secure mode, unsecure mode) the POS device 200 is operating on, etc.

In some embodiments, the secure processor 205 may not only receive touch inputs from the touch controller 215 via the multiplexer 230 but also send data such as commands to change the status of the multiplexer. For example, in some embodiments, the secure processor 205 may control the flow of touch inputs from the multiplexer 230 so that secure data is not sent to the applications processor 210. For example, when the applications processor 210, or an application running therein, sends a command such as an accessibility sequence entry commencement command (e.g., indicating start of the PIN entry process) to the secure processor 205, the secure processor may send a command to the multiplexer 230 to switch the status of the multiplexer so that the touch inputs are now routed to the secure processor. Thus, in some embodiments, the transmission of touch inputs from the multiplexer 230 may be controlled by the secure processor 205. In other embodiments, the applications processor 210 may be configured to control the multiplexer 230 directly.

FIG. 2 also illustrates examples of interface types that may be used for communication between the different components of the POS device 200, such as I2C (Inter-Integrated Circuit Protocol), GPIO (General Purpose Input/Output), USB (Universal Serial Bus), SPI (Serial Peripheral Interface), and DSI (Display Serial Interface). In other embodiments, other or additional interface types may be used. Further, in some embodiments, an interface type shown in FIG. 2 may be replaced with viable alternatives, depending for example on design constraints, supply chain requirements, component availability, etc. For example, SPI may be used in place of USB and vice-versa. Various components of the POS device 200 may be involved for the touch inputs to be processed within the POS device in different ways (for example when a PIN entry routine is running on the POS device 200 as opposed to when the display is being user to input/output non-sensitive information). For example, the applications processor 210, the secure processor 205, the touch controller 215, the multiplexer 230, the display 220, and the speaker 225 may be involved in receiving and processing touch data.

During a payment process, for example, the applications processor 210 may ask the secure processor 205 to go into a PIN entry mode. This may be done via a specific command such as the accessibility sequence entry commencement command sent from the applications processor 210 to the secure processor 205. In embodiments in which the applications processor 210 and the secure processor 205 are connected via an USB interface, such as in the example of FIG. 2, the applications processor may communicate with the secure processor, for example via RPC (Remote Procedure Call) messages over USB. The communication may also be performed via any other viable alternative technology. In some embodiments, the secure processor 205 may use a GPIO wired to the multiplexer 230 to control where touch data flows.

As the touch inputs may be sensitive data such as a PIN, it may be beneficial to keep the touch inputs secure. In some embodiments, and as discussed above, the touch inputs may flow to either the secure processor 205 or the applications processor 210, and only the secure processor may switch the flow via the multiplexer 230. In some embodiments, a mechanism used to secure the touch inputs may include the secure processor 205 switching the multiplexer 230 such that the touch inputs are fed into the secure processor itself, where the applications processor 210 receives no touch inputs until PIN entry is complete. In some embodiments, the secure processor 205 does not send any non-encrypted digits of the PIN (e.g., touch inputs) to the applications processor 210. In some embodiments, the format of the touch inputs may be vendor specific and may depend on the vendor of the touch controller 215. In some embodiments, RPC messages may be encoded in tag-length-value format (TLV), however TLV may be replaced with any other message encoding such as XML, JSON, etc.

When the applications processor 210 sends a command to the secure processor 205 indicating that the PIN entry is to begin, the secure processor may trigger the multiplexer 230 to switch so that the secure processor now receives all touch data from the touch controller 215. The applications processor 210 may periodically send messages to the secure processor 205, such as RPC messages, requesting information about the state of the PIN entry process. The secure processor 205 may return relevant events (for example also via RPC messages or other signals) as they occur, such as "first digit entered", "second digit entered", "cancelled" or "pin entry complete". In response to those messages, the applications processor 210 may then provide some feedback to the users or otherwise output information via the means for outputting information. For example, the applications processor 210 may manage the display 220 so that an asterisk is displayed on the display (e.g., for visually abled or low vision users) every time a signal is received from the secure processor 205 that a digit has been entered. As another example, the applications processor 210 may manage the speaker 225 so that an auditory message is played every time that a signal is received from the secure processor 205 that a digit has been entered. In this way, the applications processor 210 may manage the components of the POS device 200 during the PIN entry process while keeping them isolated from the secure processor 205 where the sensitive data is being processed.

The secure processor 205 may use the touch inputs to determine the PIN digits and encrypt the PIN once it is fully entered. The secure processor 205 may receive touch inputs during PIN entry and convert the touch inputs into PIN digits (e.g. numbers). The secure processor 205 may send encrypted information to the applications processor 210, which the applications processor may then send, for example to a payment gateway, and eventually to a card issuer where it may be decrypted and verified. In some embodiments, the applications processor 210 may not need to access unencrypted sensitive data and therefore the management of the other components of the POS device 200 may be performed securely and isolated from the sensitive data itself.

The components shown and explained with reference to the POS device 100 and the POS device 200 are non-limiting. The POS device 100 and the POS device 200 may each include additional components and be connected to peripherals that are useful for the overall intended performance of those terminals. For example, in some embodiments, the POS device 100 and the POS device 200 may also include various payment interfaces, such as NFC or ICC interfaces or a magnetic stripe reader (MSR), and diverse peripherals, such as a bar code scanner or external payment interface device. Additionally, although components of the POS device 100 and the POS device 200 are shown as part of a unitary device, they can be distributed in a plurality of discrete devices. For example, the processing core can be the main component of the POS device 100 and the POS device 200 and all mechanisms for outputting or inputting information may be peripherals connected to the main core. As another example, the POS device 100 and the POS device 200 may be a discrete device that may be coupled to an existing system so that the system may be augmented with the disclosed functionalities. The display 110 and the display 220 may be a display of a personal user device being used in combination with POS device 100 and the POS device 200. The speaker 105 or the speaker 225 may be a personal speaker or headphones connected to the POS device 100 and the POS device 200.

Figure 3:
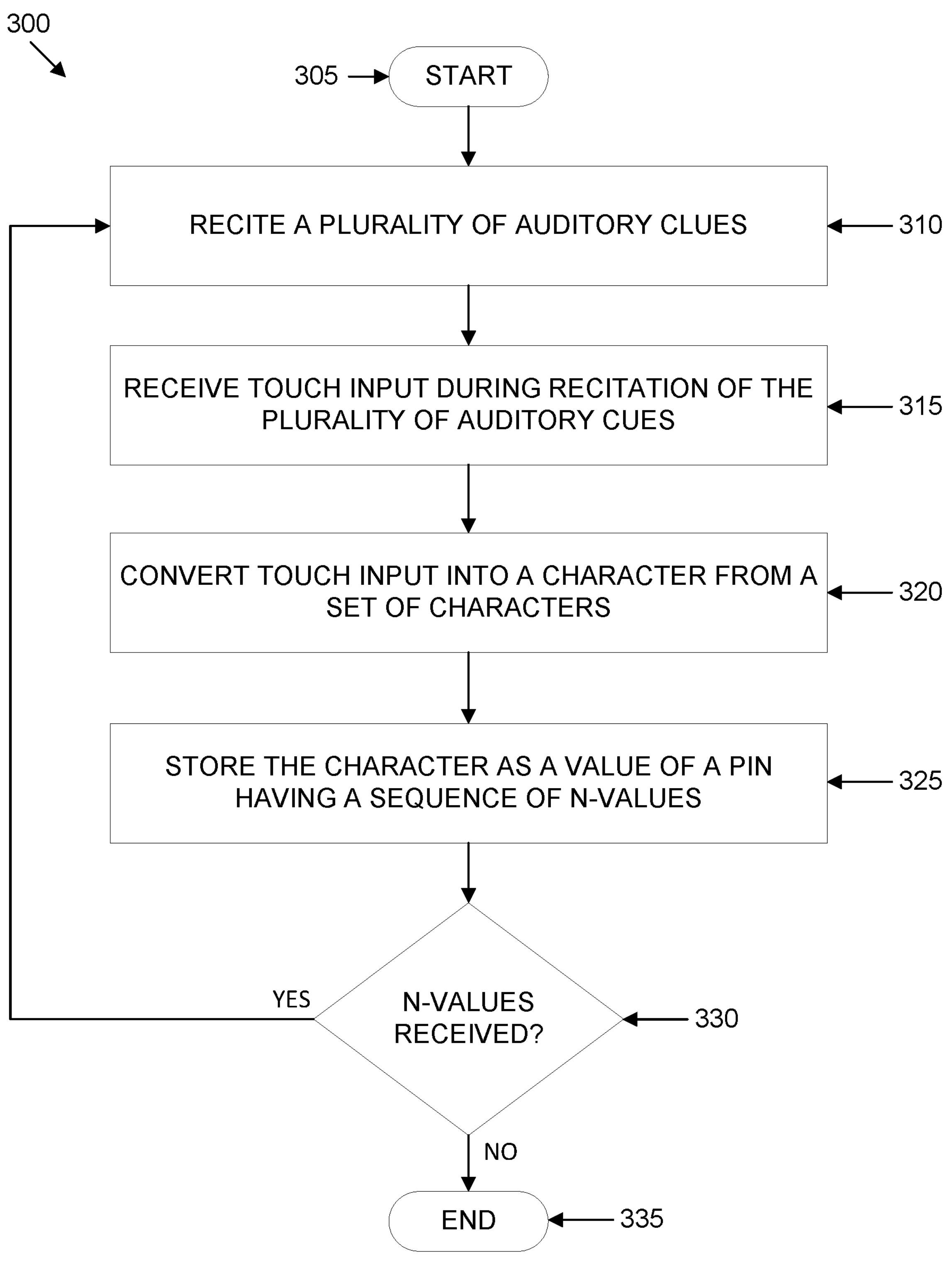
FIG. 3 is an example flowchart outlining operations for a hear tap mechanism for receiving data entry on the point of sale device by a visually impaired user, in accordance with some embodiments of the present disclosure.

Referring now to FIG. 3, an example flowchart outlining operations of a process 300 is shown, in accordance with some embodiments of the present disclosure. The process 300 is discussed in conjunction with the POS device 200. The process 300 may be used to receive a PIN from a visually impaired user of the POS device 200. The process 300 starts at operation 305 with the POS device 200 receiving an indication to operate in a second mode to allow a visually impaired user to interact with the POS device 200. As discussed above, the second mode may be entered in a variety of ways, such as by plugging in a headset, by a personnel selecting the second mode (e.g., on a merchant device), etc. In some embodiments, the visually impaired user may also be given an indication to start interacting with the POS device 200. For example, the speaker 225, upon instruction of the applications processor 210, of the headset may provide an auditory cue to the user to start interacting with the POS device 200 to enter the PIN. In other embodiments, the personnel that selected the second mode may notify the user to start interacting with the POS device 200 and/or a message may be displayed on the display 220 (e.g., for low vision users). In other embodiments, other mechanisms may be used to notify the user to start interacting with the POS device 200.

The PIN may be associated with (e.g., unique to) the user and may be required for a variety of purposes. For example, in some embodiments, the PIN may be required to identify the user, the user's account, payment information, etc. In some embodiments, the PIN may be a pre-determined set of values (e.g., a set of 4 numbers). In other embodiments, the PIN may be a pre-determined set of alphabets, combination of numbers and alphabets, etc. The explanation below is with respect to the PIN being numbers. However, in other embodiments, the PIN may assume other configurations. The auditory cues that are provided to the user may be based on the configuration of the PIN. For example, if the PIN is a series of numbers, the auditory cues may include numbers. If the PIN is a series of alphabets, the auditory cues may include alphabets, and so on.

Further, the user may interact with the POS device 200, and particularly the display 220 of the POS device, in a variety of ways to enter the PIN. For example, in some embodiments, the POS device 200 may be programmed to detect user interactions such as taps, touches for predetermined periods of time, swipes in different directions, gestures, voice commands, or other types of inputs. For example, the user may be able to enter a digit of a PIN by tapping (e.g., short tap) in a designated area of the display 220. In some embodiments, the user may be able to input additional commands during the PIN entry process, such as commands to cancel, finish, and/or erase. In embodiments in which the user enters a PIN digit via tapping, those additional commands may be provided, for example, by swipes in different directions as opposed to taps, or by holding a finger down for a predetermined time period (e.g., a long tap). As another example, commands may be provided by voice commands, via the microphone 115. In other embodiments, the user may input the PIN and other commands into the POS device 200 in other ways.

User actions or gestures may be mapped to commands to be executed by the POS device 200. A non-exhaustive list of possible user actions or gestures may include taps, swipes in different directions, such as swipe right, swipe left, swipe up or swipe down, long presses as oppose to taps, such as holding a finger down until the device determined the command was entered, or voice commands such as saying "delete" to delete, "cancel" to cancel, "finish," "done," or "enter" to finish, "yes" to confirm, "no" to reject, etc. A non-exhaustive list of possible commands that may be mapped to the user's actions or gestures include entering a PIN digit, deleting, canceling, finishing, requesting instructions, skipping instructions, repeating instructions, confirming, rejecting, or moving back and forward through the PIN entry process.

Based on the detected touch input, the POS device 200 may perform actions. For example, in some embodiments, the POS device 200 (e.g., the applications processor 210 and/or the secure processor 205) may recognize, and differentiate, between a short tap and a long tap (e.g., a press and hold). Upon detecting a press and hold action, the POS device 200 may detect that the user desires to cancel the PIN entry process and restart. In such cases, the applications processor 210 and/or the secure processor 205 may restart the PIN entry process. Similarly, the applications processor 210 and/or the secure processor 205 may be configured to map user inputs on the display 220 into specific actions.

In addition to activating the second mode to allow the visually impaired user to enter the PIN and indicating to the user to start interacting with the POS device 200, the applications processor 210 may receive an indication, as discussed above, that the PIN entry process is to begin. Upon receiving that indication, the applications processor 210 may send a command to the secure processor 205 that the PIN entry process is to begin. Upon receiving that command from the applications processor 210, the secure processor 205 may send a command to the multiplexer 230 to start sending any detected touch inputs to the secure processor instead of the applications processor. Further, each of the applications processor 210 and the secure processor 205 may reset a respective timer.

Specifically, in some embodiments, each of the applications processor 210 and the secure processor 205 may have a timer associated therewith. For example, the applications processor 210 may have a first timer and the secure processor 205 may have a second timer. Each of the first timer and the second timer may be a local timer on the applications processor 210 and the secure processor 205, respectively. In some embodiments, either or both of the first timer and the second timer may be a hardware timer embedded in the applications processor 210 and the secure processor 205, respectively, and controlled by the respective processor. In other embodiments, either or both of the first timer and the second timer may be a software module instantiated on the applications processor 210 or the secure processor 205, respectively.

During each cycle, the applications processor 210 and the secure processor 205 may reset their respective timers. More specifically, the PIN entry process may include a plurality of cycles depending upon the number of values in the PIN. For example, if the PIN is a 4 digit number, the PIN entry process may include 4 cycles. At the beginning of each cycle, the applications processor 210 and the secure processor 205 may reset the first timer and the second timer, respectively. The applications processor 210 may recite the auditory cues for the user at a pre-determined speed. For a PIN that includes numbers, the auditory cues may include numbers that are recited in a specific order. For example, in each cycle, the applications processor 210 may recite numbers 0-9 in a designated order. Further, each number may be recited at a predetermined time period. For example, in some embodiments, the applications processor 210 may recite the first number (e.g., 0) at time, t0. The applications processor 210 may then recite the second number (e.g., 1) at time, t(0+X). X may be considered a hold period or gap between the recitation of two digits. The hold period may provide the user enough time to enter an input before the next digits is recited. In some embodiments, X may be 3 or 4 seconds. In other embodiments, X may be other number of seconds. Thus, in some embodiments, the hold period may be a predetermined period of time (t) fixed for all users and for all instances of the process where the user is to enter a digit of a PIN. Further, in some embodiments, the hold period between two consecutive recitations may be the same. In other words, the same hold period may be used throughout a cycle. In other embodiments, the hold period between one or more consecutive recitations may vary. In other words, hold periods of multiple values may be used in each cycle.

The applications processor 210 may recite each number at the predetermined time period based on the counter running in the first timer. Further, in some embodiments, the predetermined time period may be known to the secure processor 205. For example, the secure processor 205 may know that the applications processor 210 recites the first number (e.g., 0) at time, t0, recites the second number (e.g., 1) at time, t(0+X), recites the third number (e.g., 2) at time, t(0+X), after the second number, recites the fourth number (e.g., 3) at time, t(0+X), after the third number, and so on. In some embodiments, X between the recitation of two numbers may be same in some embodiments. Thus, the applications processor 210 and the secure processor 205 may agree on the time period/speed at which the numbers are recited. Therefore, at the beginning of each cycle, the applications processor 210 and the secure processor 205 may reset their respective timers. In some embodiments, the secure processor 205 may also know the order in which the numbers are being recited by the applications processor 210.

At operation 310, the applications processor 210 starts reciting the auditory cues. For example, the applications processor 210 starts reciting the numbers in the predetermined order at the predetermined rate. After reciting each number, the applications processor 210 holds for a hold period before reciting the next number. Thus, the applications processor 210 recites a number, waits for the hold period, then recites another number, waits for the hold period, then recites yet another number, and so on, until all the numbers (e.g., 0-9) have been recited. After each number is recited, the user may enter a touch input (e.g., tap on the display 220) if the PIN number corresponds to the number just recited. For example, if the PIN is 1234, in the first cycle, the applications processor 210 may recite the numbers 0-9. After the applications processor 210 recites the number 1 and before the applications processor recites the number 2 (e.g., during the hold period between numbers 1 and 2), the user may tap (or provide other designated touch input) into the display 220 to enter the number 1. Similarly, in the second cycle, the applications processor 210 may again recite the numbers 0-9. After the applications processor 210 recites the number 2 and before the application processor recites the number 3, the user may tap into the display 220 to enter the number 2, and so on.

Thus, at operation 315, the touch controller 215 receives a touch input during the recitation of the auditory cues of the operation 310. The touch controller 215 may determine the touch coordinates of the display where the user tapped (or entered the touch input). The touch controller 215 may send the touch coordinates to the multiplexer 230, which may then send the touch coordinates to the secure processor 205.

At operation 320, the secure processor 205 converts the touch coordinates into a digit. As indicated above, the secure processor 205 also has a timer (e.g., the second timer) that is reset at the beginning of each cycle. The secure processor 205 is aware of the rate at which the numbers are recited. For example, the secure processor 205 may be aware of the hold period, the predetermined time period at which each number is recited, configuration of the PIN (e.g., number of digits in the PIN), and/or the order in which the applications processor 210 is reciting the numbers. For example, the secure processor 205 may know that the applications processor 210 is reciting the numbers in the order 0-9, with a hold period of X between two numbers.

In some embodiments, the secure processor 205 may note the time (e.g., from the second timer) when the touch coordinates are received from the multiplexer 230. Based on the time when the touch coordinates are received relative to the reset of the second timer in the current cycle, the secure processor 205 may convert that time into a digit. For example, in some embodiments, touch coordinates may be received at 5 seconds from when the second timer was reset in the current cycle. Since the secure processor 205 is aware of the hold period (e.g., 4 seconds) and order of recitation, the secure processor may determine that the touch coordinates were received after the applications processor 210 recited two digits (e.g., one digit at 0 seconds and another digit at 4 seconds) and before the recitation of the third digit (e.g., third digit at 8 seconds). Since the secure processor 205 knows the order (e.g., 0-9) in which the digits are recited, in the example above, the secure processor may know that the second digit that was recited is number 1. Since the touch coordinates are received between numbers 1 and 2, the secure processor 205 may determine that the touch coordinates correspond to number 1.

In other embodiments, instead of computing the time period elapsed between the reset of the second timer and the receipt of the touch coordinates, the secure processor 205 may determine the digit based on the last recited auditory cue before the user tap is received. For example, in some embodiments, the secure processor 205 may determine (e.g., based on the hold period and the time running on the second timer) which digit is currently recited in the auditory cue. For example, the secure processor 205 may know that the applications processor 210 recites the number 0 at 0 seconds, number 1 at 4 seconds, number 3 at 8 seconds, and so on. Thus, based on the time in the second timer, the secure processor 205 may know which digit is currently being recited. For example, at 5 seconds from the reset of the second timer in the current cycle, the secure processor 205 knows that the applications processor 210 finished reciting the number 1 and is in the hold period before reciting the number 2 at 8 seconds. Thus, at each second in a cycle, the secure processor 205 may know which digit in the sequence of recitations was last recited and which digit is to be recited next. When the secure processor 205 receives indication of the touch coordinates during a hold period, by virtue of keeping track of the current (or last) digit recited in the cycle, the secure processor may know which digit was recited just before the touch input was received. Thus, the secure processor 205 may associate the touch coordinates with the last recited auditory cue in the sequence. For example, if the touch coordinates are received at 5 seconds, the secure processor 205 may determine that the touch coordinates were received after the recitation of number 1 and before the recitation of number 2. Thus, when the touch coordinates are received, the secure processor 205 may know the last number that was recited, and determines that the last number is the digit that the user intended to enter.

Thus, in some embodiments, the secure processor 205 may determine the digit in two ways: (1) computing the amount of time elapsed between the reset of the second timer and the time of receipt of the touch coordinates, and (2) computing the digit based on the last digit that was recited before the touch coordinates are received. At operation 325, upon converting the touch coordinates into a digit, the secure processor 205 stores the identified digit into a secure memory (e.g., the secure memory 140).

It is to be understood that, in some embodiments, the applications processor 210 may not know when the user tapped on the display to maintain security. In other embodiments, the applications processor 210 may know that a user input was received, but may not know the touch coordinates. In some embodiments, and regardless of whether the applications processor 210 knows or not whether the user entered the input, the applications processor may continue reciting the numbers. For example, if the user enters an input after recitation of the number 1, the applications processor 210 may still continue to recite the numbers 2-9 at the same rate (e.g., same hold period), thereby avoiding the possibility that eavesdroppers may listen to the auditory cues and steal the pin. After the applications processor 210 finishes reciting the numbers 0-9, the applications processor resets the first timer and starts reciting the numbers 0-9 again. For an N digit PIN, the applications processor 210 may recite the numbers 0-9 N times. Thus, at operation 330, the applications processor 210 determines if all N values of the PIN have been received. If not, the process 300 loops back to the operation 310 where the applications processor 210 starts reciting the numbers again. Thus, the operations 310-325 may be repeated N times for an N digit PIN.

Further, upon determining at the operation 330 that additional digits of the PIN are to be received, the secure processor 205 also resets its timer (e.g., second timer). In some embodiments, the applications processor 210 resets its timer (e.g., first timer) upon reciting the numbers 0-9. Since the secure processor 205 does not receive any further communication from the applications processor after the initial command indicating that the PIN entry process is beginning, the secure processor relies on its timer (e.g., second timer) to determine when that second timer is to be reset. For example, if the applications processor 210 is reciting numbers with a hold period of 4 seconds, the secure processor may know that at 36 seconds, the applications processor would have recited all the numbers 0-9 in a cycle. Thus, after 40 seconds, the secure processor 205 may automatically reset the second timer without waiting for any communication from the applications processor 210. In other embodiments, the applications processor 210 may send a command to the secure processor 205 indicating that entry of the next digit is starting. Upon receiving that command, the secure processor 205 may reset the second timer.

Upon receiving all the digits of the PIN (e.g., when the applications processor 210 determines at the operation 330 that no further digits are to be received), the process 300 ends at operation 335. Upon receiving all the digits, the secure processor 205 encrypts the PIN and sends the encrypted PIN to the applications processor 210 for further processing and forwarding. Although the secure processor 205 has been described as identifying the digit at the operation 320 in each cycle, in some embodiments, the secure processor may receive the touch coordinates of all cycles, record the time in each cycle when the input is received, and actually identify the digits at the end when all digits have been received.

Further, in some embodiments, the user may provide two inputs in a single cycle. For example, the user may tap the display 220 after digit 1 and again after digit 2. In some embodiments, the secure processor 205 may be configured to record only the first input. In other embodiments, the secure processor 205 may be configured to record the last input in each cycle.

Figure 4:
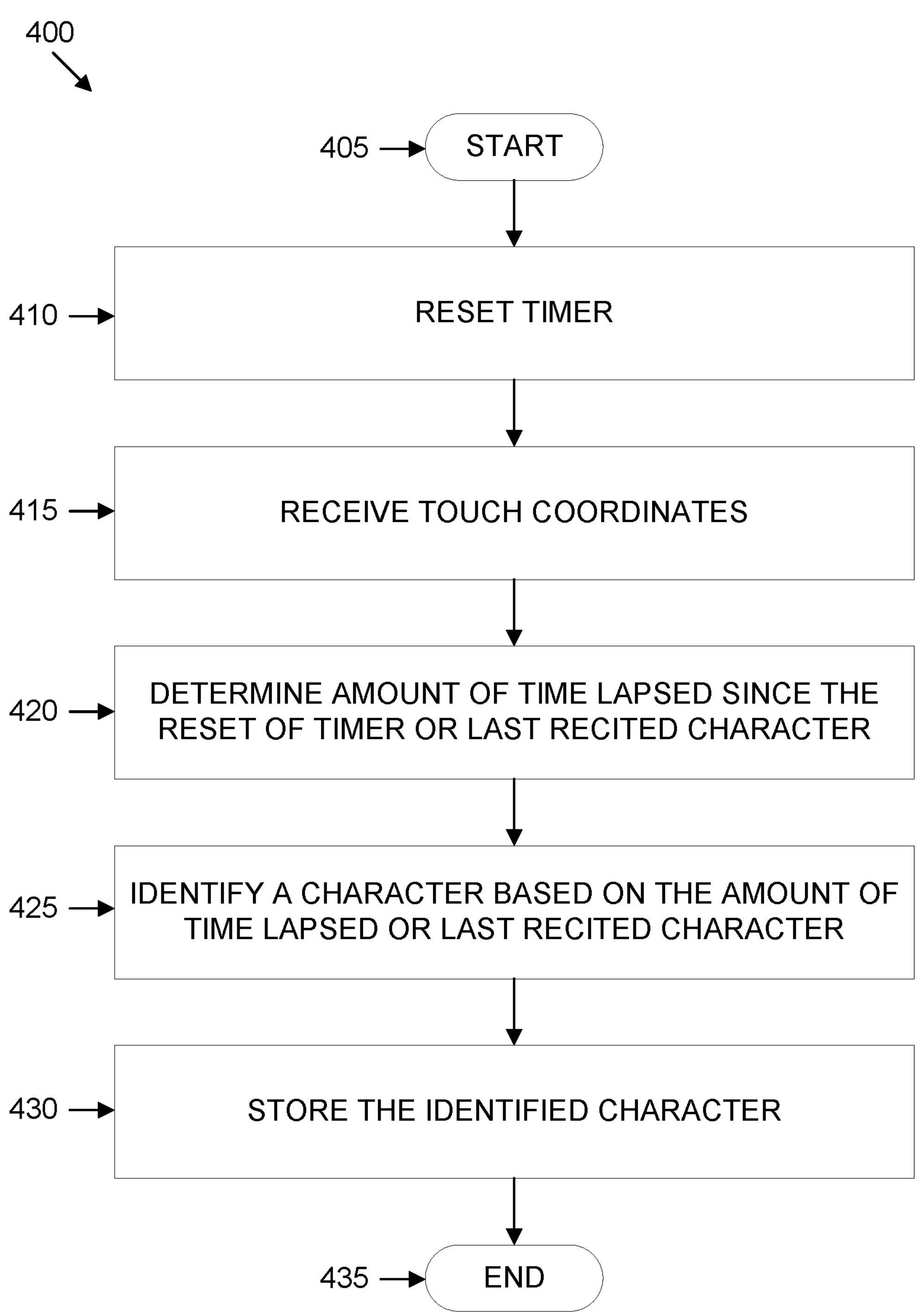
FIG. 4 is another example flowchart outlining certain operations of FIG. 3 in greater detail, in accordance with some embodiments of the present disclosure.

Turning to FIG. 4, an example flowchart outlining a process 400 is shown, In accordance with some embodiments of the present disclosure. The process 400 may be performed by the secure processor 205 in each cycle. Upon starting at operation 405, the secure processor 205 resets its timer. At the beginning of the first cycle, the secure processor 205 may receive a command from the applications processor 210. In response to that command, the secure processor 205 may reset the timer. In subsequent cycles, the secure processor 205 may reset its timer based on the amount of time passed since the reset of the timer in the current cycle, as discussed above, or upon receiving a command from the applications processor 210.

At operation 415, the secure processor 205 receives touch coordinates from the multiplexer 230 and converts the touch coordinates into a character (e.g., digit) at operations 420 and 425 based on the amount of time passed since the reset of the timer in the current cycle, as also discussed above or based upon the last recited character in the current cycle, as also discussed above. At operation 430, the secure processor 205 stores the identified character and the process 400 ends at operation 435.

Figure 5:
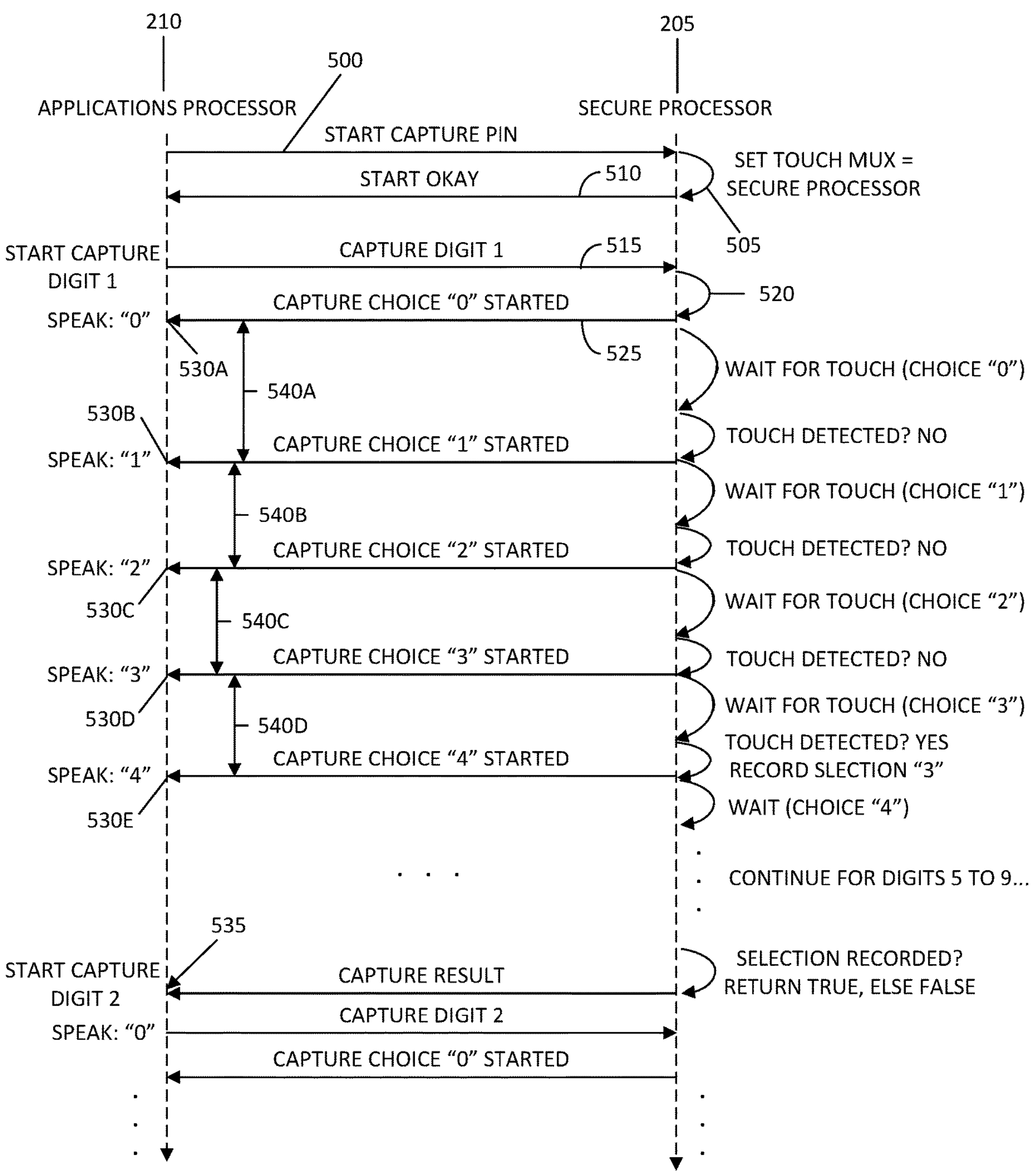
FIG. 5 is an example sequence diagram showing interactions between an applications processor and a secure processor of the point of sale device of FIGS. 1 and 2 in implementing the operations of FIGS. 3 and 4, in accordance with some embodiments of the present disclosure.

Referring to FIG. 5, an example sequence diagram outlining a process showing the interactions between the applications processor 210 and the secure processor 205 during the PIN entry process is shown, in accordance with some embodiments of the present disclosure. The process shows the applications processor 210 on the left side and the secure processor 205 on the right side. At operation 500, the applications processor 210 sends a command to the secure processor 205 to start capturing PIN. The applications processor 210 may send this command at the beginning of the PIN entry process when the applications processor receives an indication that the PIN capture process is to begin. At operation 505, the secure processor 205 sends a command to the multiplexer 230 to start sending touch inputs to the secure processor. The secure processor 205 may also send a message back, at operation 510, to the applications processor 210 acknowledging the command of the operation 500.

Upon receiving the acknowledgment from the secure processor 205, the applications processor 210 may send a message at operation 515 to the secure processor indicating that the recitation of the numbers is to begin. Upon receiving the message, the secure processor 205 may reset the second timer and send a message back to the applications processor 210 at operation 525. The applications processor 210 may also reset the first timer and start reciting the digits one by one. For example, the applications processor 210 may recite a first digit (e.g., 0) at operation 530A, a second digit at operation 530B, a third digit at operation 530C, and so on until all the digits 0-9 have been recited. After finishing recitation of all digits, the applications processor 210 starts reciting the second cycle at operation 535. The second cycle and each subsequent cycle then continues similar to the first cycle.

Further, each digit is recited after a hold period 540A, 540B, 540C, and so on. In each hold period, the secure processor 205 waits to receive a touch input (e.g., touch coordinates). When the touch input is received, the secure processor 205 identifies and records the character. Thus, the applications processor 210 sends a message to the secure processor 205 asking the secure processor to capture a digit of a PIN. The secure processor 205 acknowledges, and loops through each digit choice 0 to 9 with a fixed time between choices, calling back into the applications processor 210 to let the applications processor know when the secure processor has started the interval for a particular digit choice. This allows the applications processor 210 to speak the digit, and inform the user to tap if the spoken digit matches the digit of their PIN. This process is repeated for each digit of the PIN until all digits are captured, or until the user fails to select a digit and the process ends in failure.

Further, regardless of when or if the user taps the display 220, the applications processor 210 continues to speak the digits zero to nine. This prevents the applications processor 210 from knowing what digit was entered. The PIN is never exposed to the applications processor 210, and the selected PIN digits are never displayed or spoken back to the user. The applications processor 210 may be allowed to know if a digit was selected, after the applications processor cycles through all digit choices. Once a digit is captured in the secure processor 205, all further touch events may be ignored, until it is time to capture the next digit of the PIN. This process is repeated for each digit of the PIN until all digits are captured, or until the user fails to select a digit and the process ends in failure.

Sample pseudo code implemented by the secure processor 205 may be as follows:

```
/**
 * Wait millisToWait millseconds. When the time expires, return true if a touch event
 * occurred during the wait, otherwise false.
 */
boolean waitForTouch(int millisToWait);
/**
 * Switch the touch controller mux to either "AP" or "SP". Touch data will flow only to the
 * selected processor.
 */
void setTouchMux(String selection);
/**
 * Return the current touch selection either "AP" or "SP"
 */
String getTouchMux( );
/**
 * Store the current PIN. This is never exposed outside of the SP.
 */
int[ ] pinDigits = new int[4];
/**
 * Invoke a callback to the AP.
 */
void invokeCallback(String methodName, Object... args);
void startCapturePin( ) {
  setTouchMux("SP");
}
void stopCapturePin( ) {
  setTouchMux("AP");
}
/**
 * Obtain a single digit of a PIN. If this method returns true then the value
 * pinDigits[digitNumber] is filled in with the selected digit. If false,
 * then pinDigits[digitNumber] is not the selected digit and should not be
 * considered.
 */
boolean captureDigit(int digitNumber, long digitPeriodMs) {
  if (getTouchMux( ) != "SP") {
    // If we are invoked when the SP touch controller is not selected
    // return immediately with failure.
      return false;
  }
  int selected = -1;
  for (int choice = 0; choice < 9; choice++) {
    invokeCallback("onStartDigitChoice", digitNumber);
      if (selected != -1) {
        // User already tapped, continue waiting but ignore further taps
        wait(digitPeriodMs);
      } else {
        // Wait for user to tap
      if (waitForTouch(digitPeriodMs)) {
        selected = choice
      }
      }
  }
  if (selected == -1) {
      // No touch event received for any choice
      return false;
  } else {
      // Record tapped digit
      pinDigits[digitNumber] = selected
      return true
  }
}
```

In the code above and code below, SP is the secure processor 205 and AP is the applications processor 210. An example pseudo code for the applications processor 210 is as follows:

```
String[ ] ORDINALS = {"first", "second", "third", "fourth"};
long DIGIT_CHOICE_PERIOD_MS = 3000; // 3 seconds
int DIGIT_COUNT = 4;
/**
 * This is a wrapper to invoke RPC methods in the Secure Processor.
 */
class SecureProcessor {
    ...
}
/**
 * Callback interface between SP and AP
 */
interface SecureProcessorCallback {
    void onStartDigitChoice(int digitNumber);
}
void capturePin(long digitPerdiodMs) {
  SecureProcessor.setListener(new SecureProcessorCallback( ) {
        void onStartCaptureDigit(int digitChoice) {
      // Speak the current digit choice. If the user taps
      // after this is spoken, but before the next digit
      // choice is spoken, the SP will record.
      //
      // The SP is a simplified execution environment and
// does not have the ability to perform text to
// speech so it must call back into the AP.
          speak(digitChoice);
        }
    });
    SecureProcessor.startCapturePin(digitPerdiodMs);
    try {
    for (int i = 0; i < DIGIT_COUNT; i++) {
        speak("Tap when you hear your " + ORDINALS[i] + " digit.")
        if (!SecureProcessor.captureDigit(i, DIGIT_CHOICE_PERIOD_MS)) {
          speak("You failed to tap when your digit was spoken.");
          return;
        }
    }
    speak("PIN entered successfully.");
    } finally {
        SecureProcessor.stopCapturePin( );
    }
}
```

Figure 6:
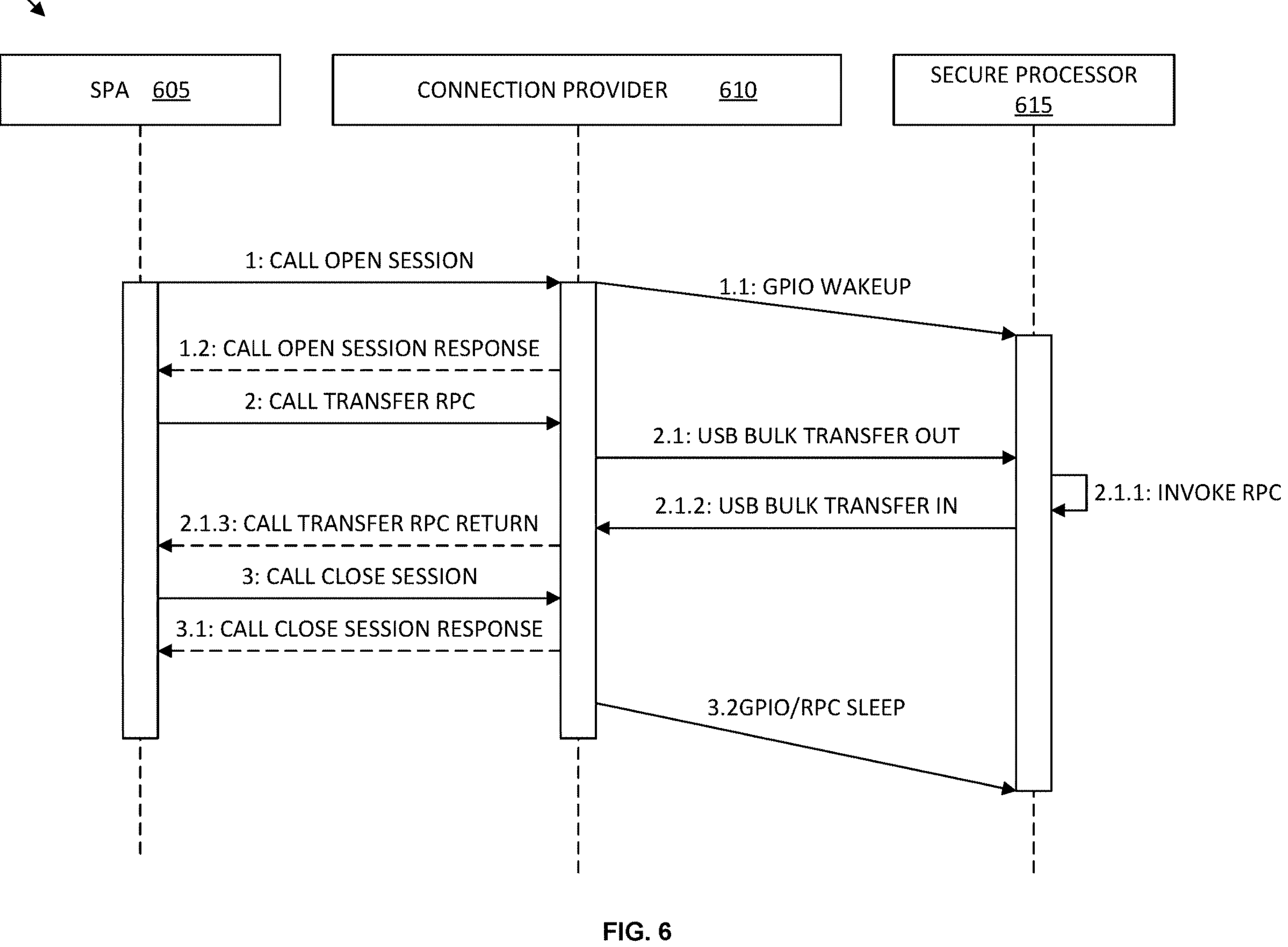
FIG. 6 is an example sequence diagram showing additional interactions between the applications processor and the secure processor, in accordance with some embodiments of the present disclosure.

Referring to FIG. 6, an example diagram outlining a process 600 for communications between a secure processor application or secure payment application (SPA) 605, a connection provider 610, and a secure processor 615 is shown, in accordance with some embodiments of the present disclosure. The secure processor 615 is analogous to the secure processor 205. In some embodiments, the secure processor 615 (also referred to as secure board or secure microcontroller) may be a chip in the POS device (e.g., the POS device 200) that is separate from the applications processor, as discussed above. The applications processor (e.g., the applications processor 210) may be a main applications processor running an operating system, such as Android. The secure processor 615 may handle sensitive information in an isolated environment to mitigate hardware and software attacks which might compromise sensitive data, such as card data or customer PIN in the case of devices that are used to process payment information. Communication between the secure processor 615 and the application processor (e.g., the applications processor 210) may occur in various ways. For example, communication between an operating system (such as Android), or the applications processor running such operating system, and the secure processor 615 may occur via remote procedure calls (RPCs). As another example, communication between an operating system (such as Android), or the applications processor running such operating system, and the secure processor 615 may occur via asynchronous signals.

RPCs may provide the bulk of the functionality and may be served, for example, over USB. The operating system, or the applications processor running such operating system, may be the USB host and the secure processor 615 may be a USB device providing a bulk in and bulk out interface. The operating system may "wake up" the secure processor 615 if the secure processor is "sleeping" using a signal. The operating system may invoke a USB bulk out method to send the RPC command and associated parameter data. The operating system may invoke the USB bulk in method and block until the secure processor 615 responds to the RPC with response data. In some embodiments, only one RPC may be invoked at a time. Signals may be implemented via GPIOs to provide a mechanism to send notifications between the two processors. In some embodiments, a STOP signal may be provided to notify the secure processor 615 to stop what the secure processor is doing in certain situations. In some embodiments, an NFC signal may be provided, for example for Mini/Mobile, to signal that the operating system may play a NFC tap success tone. Such a signal may be needed due to strict performance requirements imposed on contactless payments, that the secure micro may emit the beep itself. In some embodiments, a secure micro event signal may be provided to notify the operating system that something interesting/relevant just happened on the secure processor 615, such as a card insert or swipe or chip card inserted.

In some embodiments, the operating system may serve as gatekeeper to the secure processor 615 by managing communication to the secure processor. For example, a privileged application included in the Android platform may serve as gatekeeper to the secure processor 615 by supplying a ContentProvider that may manage all communication to the secure processor. In some embodiments, the ContentProvider may be implemented by a SecureBoardConnectionProvider (e.g., the connection provider 610). The SecureBoardConnectionProvider may provide an interface to open and close a session with the secure processor 615 to ensure that multi-step RPC operations such as taking a payment are not interrupted by other operations such as updating a real time clock or injecting keys.

In some embodiments, once a session has been obtained, a token may be returned and the UID of the caller may be recorded. From then on, the caller holding the token may invoke an RPC until the session is closed. There may be time limits on RPCs and sessions. Attempts to open a session when an existing session is already open may block in a fair queue for a given amount time until the session is available or time out. In some embodiments, POS devices may include more than one secure processor. On such devices where there are multiple secure processors, when a session is opened all secure processors may be reserved for the session owner. In this situation, the RPC call may include the intended secure processor and RPCs may be invoked on secure processors simultaneously if desired.

In some embodiments, the secure payment application (SPA) 605 may be one of the users of the secure processor 615. In the process 600, the exchange of calls to open and close session, wake up and sleep secure processor, bulk in and bulk out transfers, etc., are provided as example ways in which the SPA 605 and the secure processor 615 may initiate a session and exchange information. In other embodiments, other ways of communication are contemplated. As illustrated, the SPA 605 may send a call open session function call to the connection provider 610 which can then send a GPIO wakeup signal to the secure processor 615. The GPIO signal may be received via a GPIO connection between the secure processor 615 and the applications processor (e.g., the applications processor 210). The connection provider 610 may then send a response to the call open session function call to the SPA 605. The SPA 605 may then send a call transfer RPC to the connection provider 610 which can, in turn, initiate a USB bulk transfer of data out to the secure processor 615 using another function call to the connection provider. The USB bulk transfer of data out may pass the secure processor 615 all the information needed to conduct the session (e.g., the amount being charged in the transaction that the SPA 605 is processing, a transaction identifier for the transaction, etc.). To complete the session, the secure processor 615 may invoke a remote procedure call which leads to a USB bulk transfer of data in. The USB bulk transfer in or data may involve the secure processor 615 transferring the data required for the process to continue (e.g., encrypted payment information, a transaction authorization confirmation, etc.). The connection provider 610 may utilize other means for passing the information back and forth with the secure processor 615. Regardless, the connection provider 610 serves to return the information requested by the initial transfer RPC. As such, the process 600 may then continue with the connection provider 610 returning the data from the session in a call transfer RPC return signal. At this point, the SPA 605 may then close the session by sending a calling a close session function of the connection provider 610. Similarly to how the connection provider 610 opened the session, the connection provider may then return a close session call response to the SPA 605 to confirm the session is complete and send a GPIO or remote procedure call signal to the secure processor 615 to put the secure processor in a sleep state.

Turning now to FIG. 7, an example display 700 is shown, in accordance with some embodiments of the present disclosure. The display 700 is analogous to the display 110 and 220. The display 700 may be part of a POS device (e.g., the POS device 200). The display 700 provides a user interface that facilitates human-computer interaction between the users and the applications/secure processors. The display 700 is configured to receive user inputs from the users via a graphical user interface ("GUI") and transmit those user inputs to the applications/secure processors. The display 700 is also configured to receive outputs/information from the applications/secure processors and present those outputs/information to the users via the GUI of the display. The GUI may present a variety of graphical icons, windows, visual indicators, menus, visual widgets, and other indicia to facilitate user interaction. In other embodiments, the display 700 may be configured as other types of user interfaces, including for example, text-based user interfaces and other man-machine interfaces. Thus, the display 700 may be configured in a variety of ways.

The display 700 may include an active area 705 and buttons such a delete button 710 and a cancel button 715. In some embodiments, the delete button 710 and the cancel button 715 may be configured for use by visually abled users or low vision users. In some embodiments, other or additional buttons may be provided. Further, the location, shape, and size of each button may vary from that shown. The active area 705 may be the area where the touch sensor 120 is located. Thus, in some embodiments, the active area 705 may be the area of the display 700 where visually impaired users may enter their touch inputs (e.g., taps).

In some embodiments, the active area 705 of the display 700 may include one or more tactile features surrounding the active area to allow a visually impaired user to distinguish the active area from the remaining surface of the display 700. For example, the active area 705 may be surrounded by an edge 720. In some embodiments, the edge 720 may be a raised or beveled edge to help a visually impaired person locate the active area. In other embodiments, the edge 720 may be configured in other ways to allow a visually impaired user to locate the active area. The active area 705 may be located inside the edge 720. In other embodiments, other types of features may be provided to allow a visually impaired user to identify the active area easily.

Further, when the display 700 is on a PIN entry mode, touch buttons and other touch indications that link touches on specific locations on the screen of the display to specific actions to be taken by the POS device may be disabled. For example, a regular user interface during a PIN entry process may provide various actions buttons, which may cause the POS device to carry out specific actions when the user touches on that specific touch coordinate, such as the numbers on an on-screen PIN pad, and buttons for additional actions such as backspace, cancel or enter. Such action buttons may not be helpful for a visually impaired user and may interfere when such user is interacting with the device, unintentionally taking the process in an undesired direction.

In this way, in some embodiments, a different interface may be provided, where a visually impaired user may interact with a large portion of the display 700 with no risk of mistakenly touching action buttons and unintentionally interfering in the overall process. This different interface may be different in that any action buttons on the screen may be disabled so that the screen is only responsive to the user gestures, such as taps or swipes, regardless of the exact position where the gesture took place on the screen.

In some embodiments, specific action buttons may still be needed on the display 700 while the visually impaired user is interacting with the display. Those action buttons may be needed, for example, for a device administrator to exit the PIN entry mode or take any other action to move the process forward. In the embodiments where such action buttons exist, they can be provided in a non-trivial pattern so that a visually impaired user does not accidentally trigger an undesired action when attempting to enter the PIN via tapping. For example, such action buttons may be activated by pressing two marked specific locations at once. As another example, an additional confirmation can be requested when a user attempts to press an action button on the screen, and the confirmation button can be located at a random and not-conventional position on the screen. This way, a visually impaired user may be prevented from taken unwanted actions when interacting with the display 700 while the device administrator may still have on-screen options for assisting in the process. Similar functionality may be provided without the presentation of buttons on the screen such as by requiring a device administrator to enter a known special gesture or touch pattern to exit.

In specific embodiments of the invention, while a visually impaired PIN holder is interacting with the display 700, the content on the screen may be helpful for other purposes. For example, messages may be displayed throughout the process so that a third party, such as a device administrator, may assist the PIN holder and monitor progress. These indications may be projected on the display 700 for assistance, individually or in combination with auditory cues. Relevant instructions for a device administrator such as, for example, how to exit the PIN entry mode, may also be displayed on the display 700 while the user is interacting. As another example, the display 700 may show an indication of progress for the PIN entry process, for example by incrementing a star or filling a status bar every time the user successfully enters a PIN digit, as shown by reference numeral 725. In this way, a device administrator or a low vision user may be able to monitor the progress of the PIN entry process. Alternatively or in combination, the indication of progress may be provided in a different device administrator display.

Thus, the present disclosure provides a hear tap mechanism to allow visually impaired users to securely enter personal identification numbers (PINs) using a touch-capable surface (such as a touch screen display). The mechanism provides a secure computing environment (e.g., the secure processor 205) that is configured for connecting to the touch-capable surface and identifying user taps on the touch-capable surface. An applications processor 210 may be configured for outputting spoken audio queues and speech, and sending and receiving messages to/from the secure processor.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to disclosures containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the disclosure be defined by the claims appended hereto and their equivalents.

What is claimed is:

1. A device comprising:

a display;

two or more processors including a secure processor and an applications processor; and one or more non-transitory computer-readable media comprising computer-readable instructions stored thereon which, when executed by the two or more processors of the device, cause the two or more processors to:

transmit, by the applications processor, an indication of a secure mode to the secure processor such that touch inputs received at the display are routed to the secure processor;

cause, by the applications processor, a speaker associated with the device to serially recite a plurality of auditory cues in each cycle of a plurality of cycles, wherein each of the plurality of auditory cues corresponds to one of a set of characters;

reset, by the applications processor, a first timer of the applications processor at a beginning of the each cycle;

reset, by the secure processor, a second timer of the secure processor at the beginning of the each cycle, wherein each auditory cue of the plurality of auditory cues in the each cycle occurs at a predetermined time period relative to the beginning of the each cycle and the resetting of the first timer and the second timer;

receive, by the secure processor, based on the touch inputs received at the display being routed to the secure processor in the secure mode, a touch input on the display from a user during the recitation of the plurality of auditory cues during a time relative to the resetting of the second timer corresponding to a predetermined time period associated with an auditory cue of the plurality of auditory cues;

determine, by the secure processor, a character from the set of characters that corresponds to the touch input based on the time relative to the resetting of the second timer corresponding to the predetermined time period; and store, by the secure processor, the character as a value in a sequence of user-specific information.

2. The device of claim 1, wherein the user-specific information is a personal identification number (PIN).

3. The device of claim 1, wherein the two or more processors further execute computer-readable instructions to cause the recitation of each of the plurality of auditory cues to be separated by a hold period, and wherein the touch input is received within the hold period.

4. The device of claim 1, wherein the two or more processors further execute computer-readable instructions to determine the character from the set of characters based on an amount of time passed between a time of receipt of the touch input and the resetting of the timer.

5. The device of claim 1, wherein the two or more processors further execute computer-readable instructions to determine the character from the set of characters based on:

tracking, by the secure processor, which character from the set of characters is associated with each recitation of the plurality of auditory cues based on the predetermined time period relative to the resetting of the timer; and identifying, by the secure processor, the character that corresponds to the touch input based upon a last recited character before the touch input is received.

6. The device of claim 1, wherein the sequence of the user-specific information comprises one or more values, and wherein each of the one or more values is received in the each cycle.

7. The device of claim 6, wherein in response to the indication of the secure mode, the secure processor executes computer-readable instructions to send a command to a multiplexer associated with a touch controller of the device to send the touch input to the secure processor, wherein the touch controller detects the touch input on the display.

8. The device of claim 6, wherein the timer comprises a first timer associated with the applications processor and a second timer associated with the secure processor, and wherein the applications processor resets the first timer and the secure processor resets the second timer based upon expiration of a total time required to recite the plurality of auditory cues in each cycle of the plurality of cycles.

9. The device of claim 6, wherein each of the one or more values is a number, and wherein the plurality of auditory cues comprises numbers from 0 to 9.

10. The device of claim 1, wherein the device is a point-of-sale (POS) device.

11. One or more non-transitory computer-readable media comprising computer-readable instructions stored thereon, that when executed by two or more processors of a device, including a secure processor and an applications processor, cause the two or more processors to:

transmit, by the applications processor, an indication of a secure mode to the secure processor such that touch inputs received at a display are routed to the secure processor;

cause, by the applications processor, a speaker associated with the device to serially recite a plurality of auditory cues in each cycle of a plurality of cycles, wherein each of the plurality of auditory cues corresponds to one of a set of characters;

reset, by the applications processor, a first timer of the applications processor at a beginning of the each cycle;

reset, by the secure processor, a second timer of the secure processor at the beginning of the each cycle, wherein each auditory cue of the plurality of auditory cues in the each cycle occurs at a predetermined time period relative to the beginning of the each cycle and the resetting of the first timer and the second timer;

receive, by the secure processor, based on the touch inputs received at the display being routed to the secure processor in the secure mode, a touch input on the display from a user during the recitation of the plurality of auditory cues during a time relative to the resetting of the second timer corresponding to a predetermined time period associated with an auditory cue of the plurality of auditory cues;

determine, by the secure processor, a character from the set of characters that corresponds to the touch input based on the time relative to the resetting of the second timer corresponding to the predetermined time period; and store, by the secure processor, the character as a value in a sequence of user-specific information.

12. The one or more non-transitory computer-readable media of claim 11, wherein the user-specific information is a personal identification number (PIN).

13. The one or more non-transitory computer-readable media of claim 11, wherein the two or more processors further execute computer-readable instructions to cause the recitation of each of the plurality of auditory cues to be separated by a hold period, and wherein the touch input is received within the hold period.

14. The one or more non-transitory computer-readable media of claim 11, wherein the two or more processors further execute computer-readable instructions to determine the character from the set of characters based on an amount of time passed between a time of receipt of the touch input and the start of the recitation of the plurality of auditory cues.

15. The one or more non-transitory computer-readable media of claim 11, wherein the two or more processors further execute computer-readable instructions to determine the character from the set of characters based on:

tracking which character from the set of characters is associated with each recitation of the plurality of auditory cues based on the predetermined time period and the resetting of the timer; and identifying the character that corresponds to the touch input based upon a last recited character before the touch input is received relative to the resetting of the timer.

16. The one or more non-transitory computer-readable media of claim 11, wherein the sequence of the user-specific information comprises one or more values, and wherein each of the one or more values is received in the each cycle.

17. The one or more non-transitory computer-readable media of claim 16, wherein in response to the indication of the secure mode, the secure processor executes computer-readable instructions to send a command to a multiplexer associated with a touch controller of the device to send the touch input to the secure processor, wherein the touch controller detects the touch input on the display.

18. The one or more non-transitory computer-readable media of claim 16, wherein the timer comprises a first timer associated with the applications processor and a second timer associated with the secure processor, and wherein the applications processor resets the first timer and the secure processor resets the second timer based upon expiration of a total time required to recite the plurality of auditory cues in each cycle of the plurality of cycles.

19. The one or more non-transitory computer-readable media of claim 11, wherein each of the one or more values is a number, and wherein the plurality of auditory cues comprises numbers from 0 to 9.

20. The one or more non-transitory computer-readable media of claim 11, wherein the device is a point-of-sale (POS) device.

21. A device comprising:

a touch screen display;

a speaker; and one or more non-transitory computer-readable media comprising computer-readable instructions stored thereon which, when executed by two or more processors of the device, including a secure processor and an applications processor, cause the two or more processors to:

transmit, by the applications processor, an indication of a secure mode to the secure processor such that touch inputs received at the touch screen display are routed to the secure processor;

cause, by the applications processor, the speaker to serially recite a plurality of auditory cues in each cycle of a plurality of cycles, wherein each of the plurality of auditory cues corresponds to one of a set of characters;

reset, the applications processor, a first timer of the applications processor at a beginning of the each cycle;

reset, by the secure processor, a second timer of the secure processor at the beginning of the each cycle, wherein each auditory cue of the plurality of auditory cues in the each cycle occurs at a predetermined time period relative to the beginning of the each cycle and the resetting of the first timer and the second timer;

receive, by the secure processor, based on the touch inputs received at the display being routed to the secure processor in the secure mode, a touch input on the touch screen display from a user during the recitation of the plurality of auditory cues during a time relative to the resetting of the timer corresponding to a predetermined time period associated with an auditory cue of the plurality of auditory cues;

determine, by the secure processor, a character from the set of characters that corresponds to the touch input based on the time relative to the resetting of the timer corresponding to the predetermined time period; and store, by the secure processor, the character as a value in a sequence of user-specific information.

22. The device of claim 21, wherein the sequence of the user-specific information comprises one or more values, and wherein each of the one or more values is received in the each cycle.

23. The device of claim 1, wherein the speaker continues reciting the plurality of auditory cues in the each cycle after receiving the touch input until all of the plurality of auditory cues are recited in the each cycle.

* * * * *